US008645935B2

(12) United States Patent
Barua et al.

(10) Patent No.: US 8,645,935 B2
(45) Date of Patent: Feb. 4, 2014

(54) AUTOMATIC PARALLELIZATION USING BINARY REWRITING

(75) Inventors: Rajeev Kumar Barua, Rockville, MD (US); Aparna Kotha, Hyattsville, MD (US)

(73) Assignee: University of Maryland, College Park, MD (US)

( * ) Notice: Subject to any disclaimer, the term of this patent is extended or adjusted under 35 U.S.C. 154(b) by 911 days.

(21) Appl. No.: 12/771,460

(22) Filed: Apr. 30, 2010

(65) Prior Publication Data

US 2010/0299657 A1 Nov. 25, 2010

Related U.S. Application Data

(60) Provisional application No. 61/174,563, filed on May 1, 2009.

(51) Int. Cl.
*G06F 9/45* (2006.01)

(52) U.S. Cl.
USPC ........................................................ 717/153

(58) Field of Classification Search
USPC ........................................................ 717/153
See application file for complete search history.

(56) References Cited

U.S. PATENT DOCUMENTS

| 5,852,734 A * | 12/1998 | Komatsu et al. ............... 717/156 |
| 2006/0048119 A1 * | 3/2006 | Ren et al. ....................... 717/160 |
| 2007/0050603 A1 * | 3/2007 | Vorbach et al. ............... 712/221 |

OTHER PUBLICATIONS

William Pugh et al., "Static Analysis of Upper and Lower Bounds on Dependences and Parallelism", 1994, pp. 1-28.*
De Sutter, Bjorn et al., "Link-Time Binary Rewriting Techniques for Program Compaction", ACM Transactions on Programming Languages and Systems, vol. 27, No. 5, Sep. 2005, pp. 882-945.
Schwarz, Benjamin et al., "PLTO: A Link-Time Optimizer for the Intel IA-32 Architecture*", In Proceedings, 2001, Workshop on Binary Rewriting, pp. 1-7.
Van Put, L., "DIABLO: A Reliable, Retargetable and Extensible Link-Time Rewriting Framework", 2005 IEEE International Symposium on Signal Processing and information Technology, 2005, pp. 7-12.
Muth, Robert et al., "Alto: A Link-Time Optimizer for the Compaq Alpha", Software-Practice and Experience vol. 31, No. 1, 2001, pp. 67-101.
Cohn, Robert et al., "Spike: An Optimizer for Alpha/NT Executables", Proceedings of USENIX Windows NT Workshop, Aug. 1997, 1-8.
Cohn, Robert S. et al., "Optimizing Alpha Executables on Windows NT with Spike", Digital Technical Journal vol. 9, No. 4, 1997, pp. 3-20.
Banerjee, Utpal, "An Introduction to a Formal Theory of Dependence Analysis", Journal of Supercomputing, vol. 2, 1988, pp, 133-149.

(Continued)

*Primary Examiner* — Wei Zhen
*Assistant Examiner* — Lanny Ung
(74) *Attorney, Agent, or Firm* — Squire Sanders (US) LLP

(57) ABSTRACT

Binary rewriters that do not require relocation information and automatic parallelizers within binary rewriters are provided, as well as methods for performing binary rewriting and automatic parallelization. The method, in certain embodiments. includes disassembling a binary file and determining functions in the disassembled binary file. The method can further include rewriting the binary file without relying on relocation information or object files. Optionally, the method can further include performing automatic parallelization of the binary before rewriting the binary file.

19 Claims, 8 Drawing Sheets

(56) References Cited

OTHER PUBLICATIONS

Wolfe, Michael Joseph, "Optimizing Supercompilers for Supercomputers", Ph.D. dissertation, University of Illinois, 1982, pp. 1-224.

Towle, Ross Albert, "Control and Data Dependence for Program Transformations", Ph.D. dissertation, University of Illinois, 1976, pp. 1-113.

Banerjee, Utpal, "Speedup of Ordinary Programs", Ph.D. dissertation, University of Illinois, 1979, pp. 1-77.

Goff, Gina et al., "Practical Dependence Testing", Proceedings of the ACM SIGPLAN 1991, Conference on Programming Language Design and Implementation, Jun. 26-28, 1991, pp. 15-29.

Pugh, William, "The Omega Test: A Fast and Practical Integer Programming Algorithm for Dependence Analysis", Proceedings of the 1991 ACM/IEEE conference on Supercomputing, 1991, pp. 4-13.

Girkar, Milind et al., "Automatic Extraction of Functional Parallelism from ordinary Programs", IEEE Transactions on Parallel and Distributed Systems, vol. 3 No. 2, Mar. 1992, pp. 166-178.

Blume, William et al., "Parallel Programming with Polaris", Computer vol. 29, No. 12, 1996, pp. 78-82.

Wilson, R.P. et al., "SUIF: An Infrastructure for Research on Parallelizing and Optimizing Compliers", ACM SIGPLAN Notices, vol. 29, No. 12, Dec. 1994, pp. 31-37.

Hall, Mary W. et al., "Maximizing Multiprocessor Performance with the SUIF Complier", Computer vol. 29. No. 12, Dec. 1996, pp. 1-8.

Hall, Mary W. et al., "Detecting Coarse-Grain Parallelism Using an Interprocedural Parallelizing Compiler", Supercomputing 1995: Proceedings of the 1995 ACM/IEEE conference on Supercomputing (CDROM), 1995, pp. 1-64.

Gupta, Manish et al., "An HPE Compiler for the IBM SP2", Supercomputing 1995: Proceedings of the 1995 ACM/IEEE conference on Supercomputing (CDROM), 1995, pp. 1-44.

Saito, Hideki et al., "The Design of the PROMIS Compiler*", Proceedings of the 8th International Conference on Compiler Construction, Held as Part of the European Joint Conferences on the Theory and Practice of Software, ETAPS '99, 1999, pp. 214-229.

Yardimci, Efe et al., "Dynamic Parallelization and Mapping of Binary Executables on Hierarchical Platforms", Proceedings of the 3rd Conference on Computing Frontiers, 2006, pp. 127-137.

\* cited by examiner

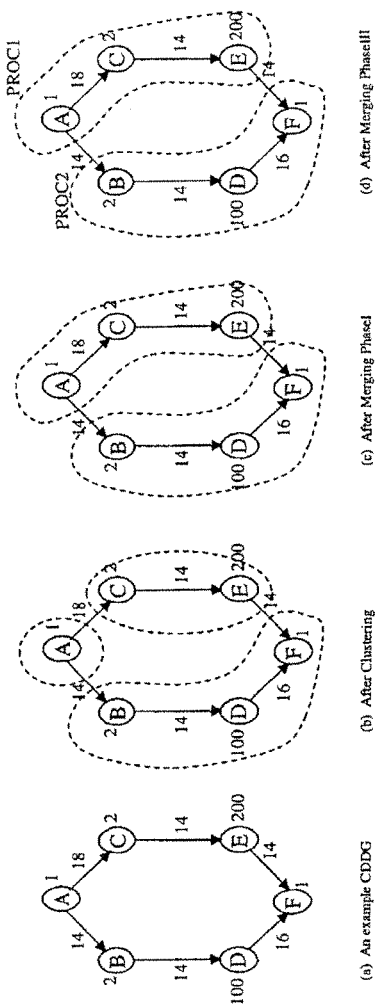
Figure 1: Running example on parallelization process. Merging Phase II is not shown as there is no change for this example

```
for i from lb_i to ub_i                for i from lb_i to ub_i              for i from lb_i to ub_i
    for j from lb_j to ub_j                for j from lb_j to ub_j              for j from lb_j to ub_j
        A[i+1,j] += A[i,j] + 1                 A[i,j] += A[i,j+2] + 1               A[i,j] = ..........
    end for                                end for                                  A[i-1,j] = ..........
end for                                end for                                  end for
(a) True-loop carried dependence       (b) Anti-loop carried dependence     end for
                                                                            (c) Output-loop carried dependence
```

Figure 2: Loop-Carried Dependencies in Source Code

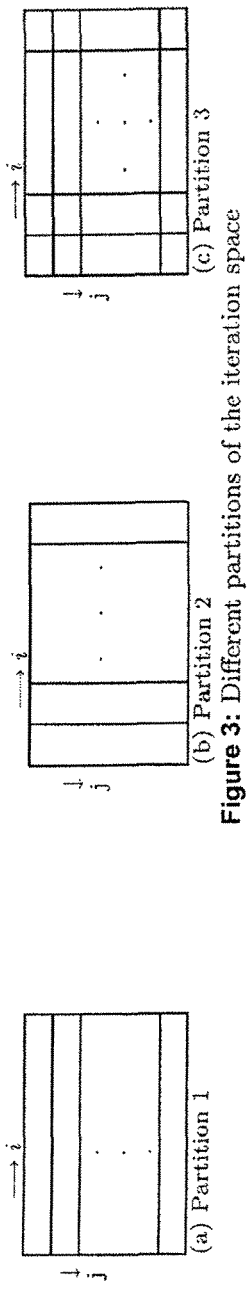
Figure 3: Different partitions of the iteration space

Source Code
```
for i from lb_i to ub_i
    for j from lb_j to ub_j
        A[i,j] = A[i,j] + 1
    end for
end for
```

Binary Code
```
1     reg_lb_i ← lb_i
2     reg_ub_i ← ub_j
3     i' ← lb_i * size_j
4     reg_ub'_i ← ub_i * size_j                           --(E)
5  loopi:reg_lb_j ← lb_j
6     reg_ub_j ← ub_j
7     j' ← lb_j * element_size
8     addr_reg ← Base + i' + j'                           --(B)
9     reg_ub_addr ← Base + i' + ub_j * element_size
10 loopj:load reg ← [addr_reg]
11    reg ← reg + 1
12    store [addr_reg] ← reg
13    addr_reg ← addr_reg + element_size                  --(A)
14    CMP addr_reg ≤ reg_ub_addr                          --(C)
15    Branch if true to loopj
16    i' ← i' + size_j                                    --(D)
17    CMP i' ≤ reg_ub'_i
18    Branch if true to loopi                             --(F)
```

Figure 4: Example showing source code and it's binary code

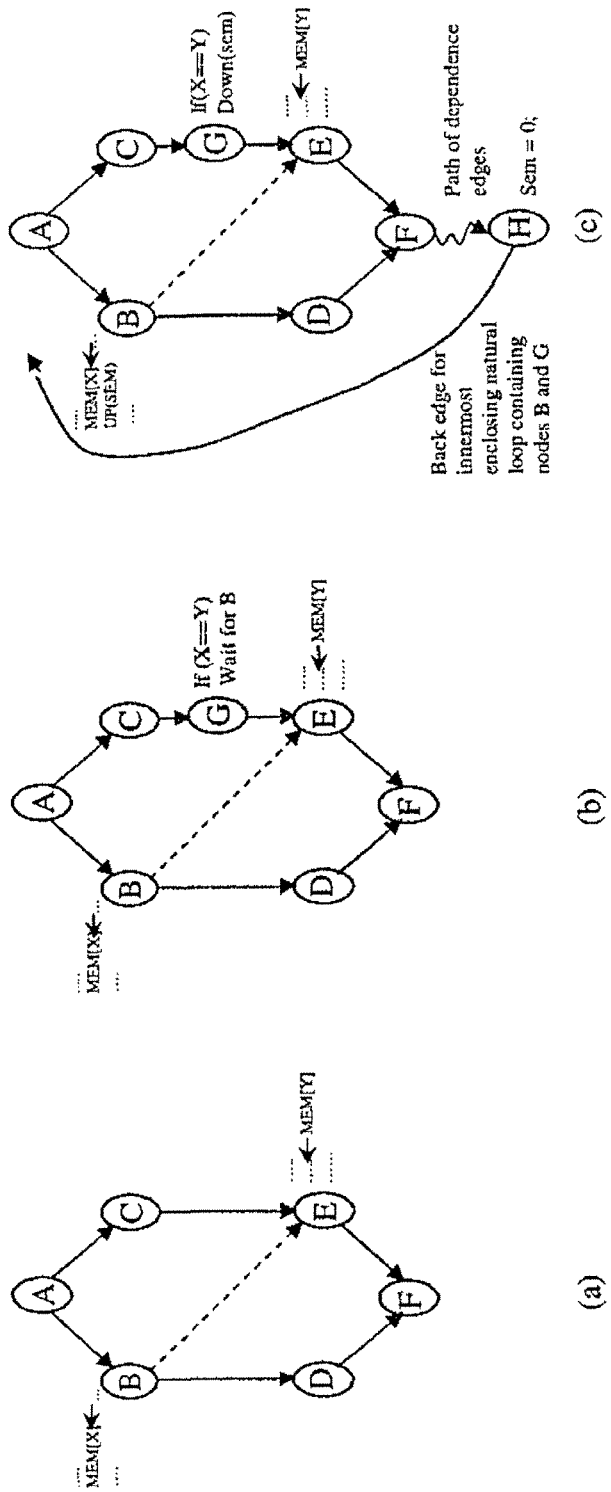
Figure 5: Example on insertion of run-time checks for a CDDG

AUTOMATIC PARALLELIZATION USING BINARY REWRITING

CROSS REFERENCE TO RELATED APPLICATIONS

This application claims priority under 35 U.S.C. §119(e) of U.S. Provisional Patent Application Ser. No. 61/174,563, filed on May 1, 2009. The subject matter of the earlier filed application is hereby incorporated by reference in its entirety.

BACKGROUND

1. Field

Automatic parallelizers within binary rewriters may be relevant to the field of computing. Specifically, such binary rewriters may improve both the functional structure of computer programs and the physical structure of their recording media in a variety of ways.

2. Description of the Related Art

Many infrastructures and tools have been built for doing either binary rewriting, object-code rewriting, or just disassembly without rewriting of the code. These include IDA, Objdump, Etch, Squeeze and Squeeze++, Dynlnst, OM, ATOM, ALTO, PLTO, Spike, and Diablo. Of these, IDA and Objdump are disassemblers only and do not attempt to rewrite code.

Binary rewriters are tools, often implemented using software running on hardware, that accept a binary executable program as input, and produce an improved executable as output. The output executable usually has the same functionality as the input, but is improved in one or more metrics, such as run-time, energy use, memory use, security, or reliability.

Binary rewriting can provide advantages even to highly optimized binaries produced by the best industrial-strength compilers. The reasons are that separate compilation is an important practical requirement; hence most compilers compile each procedure separately. In contrast binary rewriters can perform inter-procedural optimizations missing in even optimized code. Additionally, it is more economically feasible to implement a transformation once in a binary rewriter, rather than repeatedly in each of the many compilers for an instruction set. Additionally, unlike compiler-implemented technology, when a code transformation is implemented in a binary rewriter, it is applicable to code produced from any programming language, including assembly code, with no additional effort. Finally, binary rewriters can be used to enforce security rules on to-be-executed code. Although a compiler might, in theory, be able to enforce security, since the developer may, maliciously or otherwise, simply not use a compiler with security enforcement a binary rewriter can be used to enforce security rules.

Binary rewriting has many applications including inter-procedural optimization, code compaction, security-policy enforcement, preventing control-flow attacks, cache optimization, software caching, and distributed virtual machines for networked computers.

The reason for the great interest in research in binary rewriting is that it offers many features that are not conventionally available with compiler-produced optimized binaries. For example, binary rewriters can have the ability to do inter-procedural optimization. Many existing commercial and open-source compilers use separate compilation, i.e., they compile each procedure separately and independently from other procedures. The reason for this separate processing is that programs are typically distributed among several files, and to keep compile times low in the typical repeated debug-recompile cycle during development, it is important to only recompile files that have changed since the last compile. Thus, files are compiled separately. To maintain correctness for functions called across files, this usually implies that functions must also be compiled separately. For example, this is the case with GCC, the most widely used open-source compiler used commercially, even with the highest level of optimization.

In contrast, binary rewriters have access to the entire program, not just one procedure at a time. Hence, unlike in a separate compiler, inter-procedural optimizations become possible.

Another difference between binary rewriters and compilers is increased economic feasibility. It is more economically feasible to implement a code transformation once for an instruction set in a binary rewriter, rather than repeatedly for each compiler for the instruction set. For example, the ARM instruction set has over thirty compilers available for it, and the x86 has a similarly large number of compilers from different vendors and for different source languages. The high expense of repeated compiler implementation often cannot be supported by a small fraction of the demand.

Furthermore, binary compilers can work for code produced from any source language using any compiler. A binary rewriter works for code produced from any source language by any compiler.

Additionally, binary compilers can work for hand-coded assembly routines. Code transformations cannot be applied by a compiler to hand-coded assembly routines, since they are never compiled. In contrast, a binary rewriter can transform such routines.

Consequent to these advantages, a number of binary rewriters, disassemblers and object-code rewriters have been built, mostly in academia. These include IDA, Objdump, Etch, Squeeze and Squeeze++, Dynlnst, OM, ATOM, ALTO, PLTO, Spike, and Diablo.

Meanwhile, a more specific area of programming that has been underdeveloped is parallelization. Increasing transistor budgets have made multiple cores the industry norm for commodity processors. A cessation of clock speed improvements has made it imperative to gainfully use multiple cores to sustain continued improvements in execution times. One challenge is to improve the run-time of single programs. Programs can be rewritten in an explicitly parallel manner to take advantage of multiple cores. However rewriting programs by hand is extraordinarily time-intensive and expensive, especially considering the vast repository of serial code worldwide, developed at enormous expense over the last several decades.

Extracting parallelism automatically from serial programs has been done using compilers. For example, compilers such as Polaris, SUIF, and pHPF, PROMIS and Parafrase-2 automatically parallelize affine-based loops. A compiler by Kathryn S. McKinley parallelizes loops with arbitrary control flow. Non-loop parallelism has been extracted in compilers such as OSCAR, PROMIS and CASCH.

Automatic parallelization in a compiler is an alternative to rewriting code by hand. However such an idealized automatic parallelizer has been elusive. The reality is that most commercial parallelizing compilers have not implemented the parallelization technologies developed in research, keeping their benefits out of reach. This lack of 'real-world adoption is because of practical difficulties, like the need to repeatedly implement complex parallelizing technologies in multiple compilers from various vendors, each further specialized to different source languages, for a given ISA. Since each compiler only has a small fraction of the total compiler market, compiler implementation of parallelization is not economically viable.

Despite all the advances in research in automatic parallelization, resulting in several prototype research compilers; commercial adoption of these technologies has been very limited. Indeed, very few commercial compilers available today for commodity processors use any automatic parallelization techniques. Possible reasons for this include the fact that of complex parallelization technologies. Automatic parallelization methods can be very complex and mathematical, and take significant effort to implement. Also, automatic parallelization methods for compilers must conventionally be re-implemented in every compiler. The total market for such a parallelizer is divided among the many compilers typically available for most instruction sets. For example, the ARM instruction set has over 30 compilers available for it, and the x86 has a similarly large number of compilers from different vendors and (sometimes) different source languages. The high expense of repeated compiler implementation often cannot be supported by a small fraction of the demand for just for that compiler. Additionally, there is a widespread belief that non-scientific programs do not have much parallelism. Hence most non-scientific code developers are content with good serial compilers. This low demand has resulted in little incentive for compiler companies to pay for the significant investment needed to build a parallelizing compiler.

Parallelizing compilers in years past were often evaluated by their ability to exploit scalable parallelism as the number of processors was scaled to large numbers, such as 32 or 64 processors. Typically only some scientific codes met this test of success; for other (typically non-scientific) codes, automatic parallelization was deemed to have "failed," since their speedups were low and did not scale.

There does not appear to be any prior existing method or apparatus that can rewrite a binary program while performing automatic parallelization of the input binary program, and writing the thus parallelized binary program as output. There also does not appear to be any automatic parallelizer inside of an object code program rewriter.

SUMMARY

In certain embodiments the present invention is a method. The method includes disassembling a binary file into a disassembled binary. The method also includes performing automatic parallelization of the disassembled binary to provide a parallelized binary. The method further includes rewriting the binary file based on the parallelized binary. The rewriting provides a physical transformation in a recording medium relative to the binary file in the recording medium prior to the rewriting. The disassembling the binary file, performing automatic parallelization of the disassembled binary, and rewriting the binary file are performed by a particular machine.

In additional embodiments of the present invention, an apparatus includes a disassembler configured to disassemble a binary file into a disassembled file. The apparatus also includes an automatic parallelizer configured to perform automatic parallelization of the disassembled binary to provide a parallelized binary. The apparatus further includes a binary rewriter configured to rewrite the binary file based on the parallelized binary. Rewriting the binary file provides a physical transformation in a recording medium relative to the binary file in the recording medium prior to the rewriting.

The present invention, in certain further embodiments, is a computer-readable medium encoded with instructions that, when executed in hardware, perform a process. The process includes disassembling a binary file into a disassembled binary. The process also includes performing automatic parallelization of the disassembled binary to provide a parallelized binary. The process further includes rewriting the binary file based on the parallelized binary, wherein the rewriting provides a physical transformation in a recording medium relative to the binary file in the recording medium prior to the rewriting, and wherein the disassembling the binary file, performing automatic parallelization of the disassembled binary, and rewriting the binary file are performed by the hardware.

In certain embodiments the present invention is an apparatus. The apparatus includes disassembling means for disassembling a binary file into a disassembled binary. The apparatus also includes parallelizing means for performing automatic parallelization of the disassembled binary to provide a parallelized binary. The apparatus further includes rewriting means for rewriting the binary file based on the parallelized binary. The rewriting provides a physical transformation in a recording medium relative to the binary file in the recording medium prior to the rewriting.

BRIEF DESCRIPTION OF THE DRAWINGS

For proper understanding of the invention, reference should be made to the accompanying drawings, wherein:

FIG. 1 illustrates an example of a parallelization process.

FIG. 2 illustrates loop-carried dependencies in source code.

FIG. 3 illustrates different partitions of the iteration space.

FIG. 4 illustrates source code and its binary code on which an embodiment of the present invention has been partly applied.

FIG. 5 illustrates an example of insertion of run-time checks for a closure of data and control dependencies graph (CDDG).

DETAILED DESCRIPTION OF THE PREFERRED EMBODIMENT(S)

Figure 6:
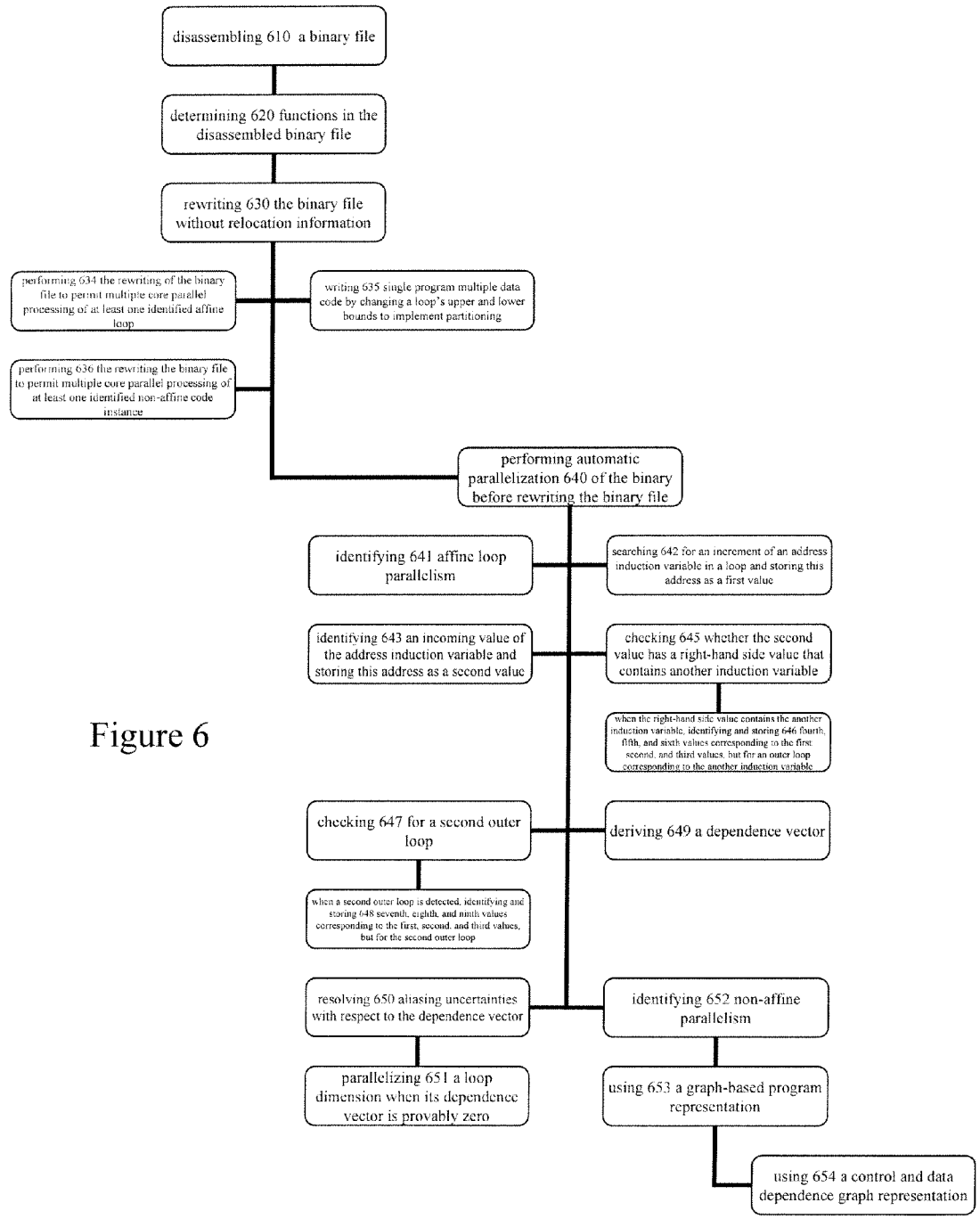
FIG. 6 illustrates a method according to certain embodiments of the present invention.

Compiler analyses are provided by certain embodiments of the present invention. These analyses include control-flow analysis, dataflow analysis, memory disambiguation, stack analysis, variable analysis and other analyses built on these. These analyses can be used for a variety of compiler optimizations and other code transformations.

Certain embodiments of the present invention provide a rewriter that is retargetable to different instruction certain architectures (ISAs) with minimal effort. This can be achieved by describing the instruction set in a custom extensible mark-up language (XML) format. By using different XML files, different ISAs can be targeted. Formats other than XML may also be used.

Certain embodiments of the present invention further provide a sophisticated inter-procedural static profiler that computes profile data that is useful for a variety of optimizations.

Automatic Parallelization Using a Binary Rewriter

A tool that may be of use within a binary rewriter infrastructure is an automatic parallelization tool. The issues in rewriting object code with automatic parallelization may be very similar to rewriting binary code. Thus, reference to embodiments should be understood to be generally applicable to both binary code and object code, although certain embodiments may address only one or the other. Such a tool may be able to automatically parallelize serial programs for parallel computers, including small-scale multi-cores and large-scale parallel machines.

Most modern processors have multiple cores inside them. On such processors, parallel programs running on multiple cores simultaneously achieve the best performance by running faster than serial programs. However, serial programming is less time consuming for the programmer, increasing programmer productivity. Moreover, most of the world's existing software is serial. Hence automatically extracting parallelism from serial programming has the potential to improve the run-time of those programs at a low cost, without burdening the programmer.

Certain embodiments of the present invention provide technologies to automatically extract parallelism from serial programs inside of a binary rewriter. A binary rewriter is a tool that takes a binary executable as an input and outputs a more improved binary as an output. The input can be a serial binary program, and the output can be a parallel binary program. The primary benefits of such technology are that the output program will run faster and consume less energy than the input program.

Although a compiler may be able to perform automatic parallelization, automatic parallelization in a binary rewriter is different from automatic parallelization in a compiler in several ways. First, a parallelizer in a binary rewriter is implemented only once for an instruction set, rather than repeatedly for each compiler. This makes it much more likely that high quality parallelizers using binary rewriting will be implemented, as companies are more likely to recoup their investment. Second, a parallelizer in a binary rewriter can work for all compilers and languages. Related to the previous point, a parallelizer in a binary rewriter works for all binaries produced using any compiler from any source language. This compatibility is a huge practical advantage. A binary rewriter is a simple add-on to any existing software development toolchain. A binary rewriter can even parallelize legacy binaries for which no source is available, perhaps because the developer is out of business, or the code is lost. No compiler can do this. Additionally, an automatic parallelizer in a binary rewriter can work for assembly-language programs. A binary rewriter can parallelize assembly code, regardless of whether it is part of the program or all of it. Compilers allow inlined assembly code, but there are no methods to parallelize assembly code. Assembly code is used sometimes to write device drivers, code for multi-media extensions, memory-mapped 110, and time-critical code portions.

Parallelization in a binary rewriter must overcome several challenges not present in parallelization in compilers. For example, symbolic and relocation information, present in a compiler, are often absent in binary programs. Most existing compiler technologies rely on such information to parallelize programs. For example, existing compiler methods rely on knowing what the variables (especially array variables) referenced by the program are, and their sizes. This information is not easily available in binary code, making the use of existing methods non-obvious in a binary rewriter. Non-array parallelization methods rely on knowing where other high-level data structures, their internal types, and their sizes—this too is not easily available in binary code.

Even if the list of symbols is present in the binary code, it is conventionally difficult to discover the referenced symbol (or set of possible referenced symbols) for each register and memory access in the binary program. Since existing compiler parallelization methods need this information, it is not obvious how they would be applied to a binary rewriter which lacks this information.

One of the hindrances to parallelism is the presence of memory accesses in code that could potentially alias with the parallel memory accesses. Precise pointer analysis methods can overcome many of these hindrances in a compiler. However precise pointer analysis methods are not available in a binary rewriter; indeed, they might not even be possible. This makes parallelization much more difficult in binary rewriter than a compiler.

In a binary rewriter, there may be sections of the binary executable that cannot be disassembled into instructions because it is not possible to determine if those sections are code or data. Ensuring correct parallelization in the presence of non-disassembled code requires new methods. This concern does not exist in compilers since they have no non-disassembled code.

Many existing compiler methods for parallelizing programs rely on recognizing affine arithmetic expressions containing symbolic variables. Since recognizing such affine expressions in the binary is much harder lacking symbolic information, implementing such compiler methods in a binary rewriter is not immediately obvious.

Some interprocedural compiler methods for parallelization rely on the presence of a complete, or near complete, call graph. Since such a call graph is much harder to recover in a binary because of the presence of indirect call instructions, the compiler methods cannot be directly applied in a binary rewriter.

As discussed below, compiler methods can be adapted to a binary rewriter, in a way that addresses the aspects discussed above. The challenges are overcome by either discovering the above-mentioned missing information in the binary, or by devising new modifications to existing methods that do not require the missing information. The methods are discussed more fully below.

As noted above, an automatic parallelizer can be implemented inside a binary rewriter instead of a compiler. A binary rewriter according to certain embodiments of the present invention takes as input any serial binary executable, and produces as output a parallel binary executable with the same functionality but faster run-time. This approach has the following attractive features not present in compiler implementations. The parallelizer can be compatible with executables from any source, regardless of the source language, dialect, compiler, linker and set of libraries used. The parallelizer can be implemented only once per instruction set; instead of repeatedly for every compiler. The rewriter can parallelize legacy binaries for which no source is available. It can parallelize code written partially or wholly in assembly language. An inter-procedural parallelizer can be built in a binary rewriter without breaking separate compilation, unlike in a compiler.

An integrated parallelization method for a binary rewriter can include three components: a general-purpose ("non-loop") inter-procedural parallelizer that extracts statically-determinable parallelism from all types of programming constructs, without focusing on parallelism within loops; a loop parallelizer that extracts parallelism between iterations for loops containing affine array accesses; and a run-time parallelizer that uses run-time checks to parallelize for cases when parallelism is likely but cannot be guaranteed statically. These three components can be implemented in an integrated framework that selects the best parallelism type for each code instance using a sophisticated cost model. The three parallelizers can be built without using any source-level information that is not available in a binary, such as symbolic information.

This disclosure presents methods to implement automatic parallelization inside a binary rewriter, instead of a compiler. A binary rewriter, as explained above, is a tool that can be implemented in hardware, or software running on hardware, that takes a binary executable program as input, and outputs an improved executable as output. In the discussion below, the input code will be serial, and the output will be parallel. There are no conventional methods for automatic parallelization in a binary rewriter.

The approach discussed below provides some adaptations of ideas from existing compiler methods to a binary rewriter. This adaptation is not trivial, since binary rewriters pose challenges not present in a compiler, including primarily, the lack of symbolic information. Parallelizing compilers rely on symbolic information, for example for identifying arrays, affine function indices, and induction variables; for renaming to eliminate anti and output dependencies; and for pointer analysis to prove that memory references cannot alias, allowing their parallel execution. Binaries lack symbolic information, making all these tasks more difficult. Contributions of this disclosure include parallelization methods in a binary rewriter that can work effectively without using any symbolic information.

On the flip side, binary rewriters also enjoy an advantage compared to a compiler: they have access to the entire program including library code. The need for separate compilation—an important practical requirement—has meant that commercial compilers typically have access to only one file at a time. For large programs with many files, this represents a tiny sliver of the total code. Whole-program parallelization is important since parallelization in one procedure level may inhibit parallelization at containing or contained procedures, and moreover, parallel code blocks may be in different files. Automatic parallelization at link-time is possible in theory, but no one has proposed it. Indeed, link-time parallelization would require technologies similar to what is discussed below, for a binary rewriter, since linkers operate on low-level object code, which is similar to machine code. The technologies discussed herein can equally be applied to linkers or binary rewriters, but the latter are not tied to any particular vendor's platform.

There present discussion describes a prototype binary rewriter with automatic parallelization for the Intel x86 architecture. This prototype helps to demonstrate the feasibility of this vision. A binary rewriter infrastructure in has been built for the x86 platform, as discussed above, and the automatic parallelizer can built on that infrastructure.

Effectively utilizing the multiple cores on small-scale commodity processors is probably the biggest single challenge facing the computer industry today. An automatic parallelizer in a binary rewriter provides a unique and highly promising new opportunity to address this huge challenge. The solution is applicable to a broad-base of programs and allows a single implementation across all compilers and languages.

Three types of parallelism can be implemented in an integrated framework: non-loop parallelism, loop parallelism, and run-time discovered parallelism.

Parallelizing Non-Loop Constructs

This section presents how arbitrary non-loop code in applications is parallelized in a binary rewriter. By "non-loop" code, it is meant that parallelism between different iterations of a loop is ignored; instead all other types of parallelism are explored. Later, a method to extract parallelism between different iterations of a loop, for loops containing affine accesses to arrays is discussed. However, the non-loop method may be able to run entire loops in parallel with other code.

An hierarchical task parallelism method can be used to analyze programs for parallelism and represent the parallelism in a graphical form. Other methods can be used, but the method to be discussed is complete, inter-procedural and particularly elegant. A method can use an existing representation of parallelism to statically schedule a parallel version of the program.

Hierarchical Task Parallelism Approach

The hierarchical task parallelism approach represents the program's parallelism in a Closure of Data and control Dependencies Graph (CDDG). An example CDDG at a certain level of the program is shown in FIG. 1($a$). The nodes in the CDDG are either instructions or loops, and the edges between nodes represent control and data dependencies between instructions. The body of each loop is a separate CDDG, thus leading to a hierarchy of CDDGs, each containing sub-graph CDDGs for contained loops. Further the body of each procedure is in a separate CDDG. Procedure call instructions are encapsulated inside single nodes, and the callee procedure's CDDG is considered to be a hierarchical sub-graph of the caller's CDDG.

Although the description of non-affine binary parallelization methods in this patent is illustrated using the CDDG as a specific example, the scope of this invention should not be limited only to methods that work on the CDDG. Similar methods that work on other graph-based program representations of binary programs such as (but not limited to) the Program Dependence Graph (PDG) or the Control-Flow Graph (CFG) combined with dataflow information, are also within the scope of the invention.

In FIG. 1($a$), nodes and edges are marked with their runtime costs, estimated later in this subsection. For simplicity the CDDG in FIG. 1($a$) is only for one level; hierarchically contained sub-CDDGs are not shown. Indeed, in the example, nodes D and E are meant to be sub-CDDGs containing loops or procedures, since their estimated costs shown (100 and 200) are much larger than typical instruction costs. The remaining nodes are instructions. Since only the body of the loop is represented and sub-graph loops are collapsed into single nodes, the CDDG at each level is acyclic.

CDDG edges are of three types. First, there are control dependence edges. Such an edge X Y implies that node Y is executed along some, but not all, control outcome paths of X. The last instruction in X must be a conditional branch. Second there are data dependence edges. Such an edge X→Y implies that node Y uses some value computed in X, but only if node X is executed. Third, there are closure edges. Such an edge X→Y is meant to signal to Y that some other node X', such that X'→Y is a data dependence, will not be executed; hence Y need not wait for X'.

To understand the parellelization method to be considered, the following intuitions about the CDDG should be understood: two nodes can be executed in parallel if there is no path of edges between them in the CDDG; a node can be executed when any one of its control predecessors has completed execution and all of its data dependencies have been satisfied. The only exception are multiple data dependence predecessors on the same value, in which case the node only waits for any one of such predecessors to be completed. The type of dependence is not shown for each edge in FIG. 1($a$), since it largely does not affect the parallelization strategy being discussed. It only impacts how the serialization of dependence edges is enforced using semaphores using the rules above.

Adapting the CDDG construction to a binary rewriter involves recognizing all the procedures. Recognizing all the procedures is easy in a binary with relocation information—most existing linkers can be instructed through command-line arguments to retain such information that lists all procedures. For third-party binaries that lack symbolic information, recursive traversal can be used which tracks all procedure calls to identify their targets as procedures. However targets can be identified only if they are statically constants, although some improvements to this technique can be made. In most binaries, virtually all the code is disassembled in this way. Since non-disassembled code may have dependencies with other code, non-disassembled code is not parallelized for third party binaries. In most cases, this problem is rare, and can be eliminated by using binaries with relocation information.

At this point, the CDDG can be considered as constructed in the binary. Before looking at how the method being discussed parallelizes the CDDG, an estimate of the run-time of each CDDG node is to be made. A static profiler associates a static frequency estimate F(I) with every instruction I. Frequencies are actually computed per basic block, but for the CDDG, it is useful to think of the properties of individual instructions. F(I) can be computed by a recursive traversal on the call graph and the Control Flow Graph (CFG). F(I) is an estimate of the number of times I would be called when the application is executed. When I is in a loop of nesting depth k, a relative frequency of $10^k$ can be associated with it, much like register allocation does, compared to its entry point. Frequencies can be halved for the THEN and ELSE parts of IF constructs. Although static profiling leads to poor results in separate compilers, it is far more accurate in a whole program environment such as a linker or binary rewriter. In a separate compiler, each procedure is compiled separately; thus estimating the frequencies of procedures other than memo is not possible. However, in a binary rewriter the entire program is visible. Since these estimates are computed inter-procedurally using recursion on the call graph, static profiling is quite good at comparing expected frequencies across the whole program.

Suppose E(I) is the run-time for one instance of instruction. For example, E(I) maybe 1 for arithmetic instructions and 4 for integer multiplication instructions. From E(I), the total time TT(n) spent in a CDDG node n can be computed as:

$$TT(n) = \sum_{\forall I \in n} F(I) \times E(I)$$

A more interesting metric for parallelization at a certain CDDG level is the estimated run-time T(n) of a node n for one execution of that node. This is the same as its relative frequency versus the entry point of the loop, hence:

$$T(n) = \frac{\sum_{\forall I \in n} F(I) \times E(I)}{F(\text{entry\_point\_of\_n})}$$

Next each node and edge is marked in FIG. 1(a) with its estimated cost. Each node n in the CDDG for the loop is marked with T(n), its estimated run-time for one run. Each edge in the CDDG is marked with the synchronization cost for when the source and destination of that dependence edge is mapped to different processors. The synchronization cost is avoided when the source and destination are mapped to the same processor.

The edge synchronization cost is estimated as follows. The synchronization implements the serialization needed to enforce that dependence edge across processors. The one-word synchronization cost S is a platform-specific number that represents the latency for communicating one word between two processors in a commodity chip-multiprocessor. This is 10-20 cycles in today's processors, representing a round-trip to the shared L2 cache through which the communication of the semaphore variable happens. This is the fastest method for inter-processor communication in commodity multiprocessors since the L2 is that fastest shared level of the memory; the register files and L1 cache are usually private. FIG. 1(a) assumes that S=14 cycles. Some of the edges are marked with a cost greater than 14 cycles when in addition to the semaphore variable, data is also communicated along that edge to satisfy a true data dependence. Since most of the latency of multi-word communication can be overlapped with the first word, the additional cost of multi-word communication is low. For example, the D→F edge is marked with a cost of only 14+2=16 cycles since one extra data word requires only two extra cycles to communicate.

Multilevel Parallelization Method

First all the CDDGs are constructed at various levels, and all nodes and edges are marked with their estimated costs. Next, the inter-procedural method for parallelizing a hierarchical CDDG will be described.

To understand a method according to certain embodiments of the present invention the following intuition is useful—frequently executed nodes should be parallelized before less frequently executed ones. This is because there could be more than one way to parallelize an application—for example, two nodes could be parallelized across two processors in a CDDG, or parallelism could be used in only one of the nodes by looking at the hierarchically enclosed CDDG inside that node. Which approach is better depends on which parallelism yields higher benefit. Since parallelizing regions with higher frequency is likely to yield higher benefits, intuitively it is better to parallelize frequently executed nodes first.

When a CDDG consumes a certain number of processors, those processors become unavailable for other hierarchical CDDGs in the same program. More precisely, let NPROC be the total number of processors on the machine. Parallelizing a graph G to use K processors prevents parallelization of G with any other node in the graph $G_p$=parent(G) among those K processors. However, it can be parallelized with other nodes using the remaining (NPROC-K) processors, provided (NPROC-K)>0. However, parallel regions in $G_p$ not containing G can still use all NPROC processors. To keep track of tins, R(G) is defined as the number processors used to parallelize a graph G, and assign R(G)=K as above.

The parallelization method according to certain embodiments now more fully explained. Intuitively, among the CDDGs at different levels in the program, a method according to certain embodiments of the present invention searches for the CDDG level with the most profitable parallelism. It schedules that parallelism, and recalculates its impact on the parallelism for its parent and child graphs. Next it applies this method to the next-most-profitable parallelism, and so on, until all the graphs are scheduled. A more detailed version of this multi-level algorithm is as follows:

1. Perform single-level parallelization on each acyclic CDDG graph G in the program, ignoring any sub-graphs that it contains, or that contain it. A single-level parallelization strategy will be presented later in the discussion. Let the benefit of parallelizing G, denoted by B(G), be defined as the estimated number of cycles saved by parallelizing G on all the NPROC processors. B(G) is computed by:

$$B(G) = \text{Serial\_run\_time}(G) - \text{Parallel\_run\_time}(G)$$

At this point, the parallelizations of each CDDG are marked as uncommitted since none of them have been finalized yet. The estimated Serial_run_time(G) is computed as $\sigma_{\forall n \in G} T(n)$. The estimated Parallel_run_time(G) is the run-time of longest run-time path in the graph. The run-time of a path is the sum of all the node run-times in it, plus the sum of edge costs for the subset of edges in the path that connect nodes mapped to different processors by this parallelization.

2. Commit the parallelization of the uncommitted CDDG graph G with the highest benefit B(G). Let the number of processors that can profitably exploit that parallelism be K. (That is, more than K processors provide no additional benefit.) Assign R(G)=K. Mark all sub-graphs contained in G recursively as committed with no parallelism.

3. Re-compute the single-level parallelization on CDDG G=parent_graph(G), but this time using the exclusion constraint that G has already consumed K processors (i.e., R(G)= K). Recalculate B(G) for this parallelization.

4. If the parallelization of any CDDG remains uncommitted, goto step 2.

Since this multi-level method can be implemented in an (object-code) linker or binary rewriter, it can look for parallelism between code in different files, unlike source-level separate compilers, which must explore parallelism only within single files. Whole-program availability also allows more intelligent consideration of the exclusion constraint, by first selecting the most profitable parallelism across files. The multi-level implementation leverages all these advantages and helps to quantify their effect.

Single-Level Parallelization Method

A single-level parallelization method is called by Steps 1 and 3 of the above multi-level method. This single-level method parallelizes a single acyclic CDDG graph G to NPROC processors ignoring other levels. It allows for R(n) for some n in G to be ≥1 if n is itself a loop node parallelized earlier.

The single-level parallelization method may have some similarities to earlier methods for MIMD task scheduling and the PI's earlier work on instruction scheduling for Raw. However it is not identical to those approaches; the method is adapted for parallelism granularity, graph model and exclusion constraint. The method is divided into four phases—clustering, and merging phases I, II and III—as described below.

Clustering groups together instructions that have no parallelism, assuming non-zero communication cost but infinite processing resources. Clustering by visiting nodes in topological order (i.e., any order where a node is visited after all its parents) and doing the following. For each node, if its in-degree is zero, start a cluster at that node. If its in-degree is one or more, then identify all the parents that have no other child. If this set is non-zero, then among those parents, merge this node with that parent's cluster with which it has the highest communication cost. This is done because the processors executing all such parents will become idle anyway; hence scheduling one of its children on it is logical. Among these, merging with the parent with which the node has the highest communication cost ensures that this highest cost is eliminated, since the communication cost is zero to the same processor. If the above two rules did not apply, then start a new cluster for this node. In the running example, FIG. 1(b) shows the result of clustering on the CDDG in FIG. 1(a). Three clusters result: {A}, {B, D, F} and {C, E}.

In merging phase I, instructions which have no parallelism continue to be grouped together. However, this time the children of nodes are examined as candidates for merging, instead of the parents. In particular, for each node whose children are all in different clusters from it, identify all the children that have no other parent. If this set is non-empty, then among these children, merge the parent node with the child cluster that reduces the run-time of the program the most. Since all identified child clusters are serial from the parent, there is no point in leaving the parent processor idle, and hence it might as well be reused for one of its children—merging phase I guarantees this. FIG. 1(c) shows the result of merging phase I on the clusters in FIG. 1(b). Three clusters reduce to two: {B, D, F}, and {A, C, E}.

In merging phase II, clusters are merged whose parallelism is too fine grained to be exploited profitably. For this, pairs of nodes X and Y are identified, such that, intuitively, X spawns parallelism for which Y is the join node. More formally, this implies that X's out-degree and Y's in-degree both exceed one, all paths from the start of the CDDG to Y go through X, and all paths from X to the end of the CDDG go through Y. When looking for such X and Y pairs, increasing order of distance between X and Y is searched in the acyclic CDDG. For each such pair X and Y, if the estimated parallel run-time of the code between X and Y in the CDDG, inclusive of both, exceeds its serial run-time, then the parallelism is too fine grained to be exploited. In such a case, X, Y and all the nodes between them can be merged into one cluster. In FIG. 1, the result of merging phase II is not shown since there is no change from part (c).

In merging phase III, the number of clusters is reduced to the number of processors actually available. This sacrifices run-time compared to a hypothetical machine in which there are more processors, so the least valuable parallelism is sacrificed, to the extent possible. A list-scheduling algorithm is employed in which code is simultaneously scheduled for NPROC processors, described as follows. Among the nodes ready to execute, nodes are scheduled in decreasing order of their priority. The priority is defined as the length of the longest critical path from that node. Schedule the highest priority node n on R(n) processors at the earliest next cycle in which R(n) processors are simultaneously available. If more than R(n) processors are available at that cycle, schedule n on that sub-set of processors whose latest scheduled clusters have the highest communication cost to n. When scheduling a node, add its estimated completion cycle to the list of cycles with events scheduled. Finally, increment the cycle counter to the next cycle for which an event is scheduled. FIG. 1(d) shows the result of merging phase III on the input in FIG. 1(c) on a two-processor machine. Each of the two clusters is assigned to a processor.

This is a basic non-loop parallelization method. It does not use any information unavailable in the binary, such as symbolic information. It also uses whole-program information aggressively since that is always available in a binary.

In the above, procedure CDDGs are parallelized the same way, regardless of their caller. Parallelizing the procedure differently for different callers can yield benefits since the most profitable parallelism may be in different CDDG levels along different paths of the call graph. Cloning the procedure differently for different callers can achieve this customization for different call paths. Selective procedure cloning can be implemented to keep the code growth to the minimum Removing Dependencies This section shows how serialization from unnecessary dependencies can be overcome in a binary rewriter. Overcoming anti and output dependencies can be accomplished by removing anti and output dependencies from the CDDG before parallelization. Whereas true data dependencies necessarily impose serialization, compilers often avoid serialization from anti and output dependencies by using renaming. For instance if a read of variable x is followed by a subsequent write to x, leading to an anti-dependence, the serialization can be avoided by renaming the write to x to use a different compiler-generated variable. SSA representations in the source do renaming automatically by creating a new variable for every definition in the program. Although the binary rewriter according to certain embodiments of the present invention also does SSA-form dataflow, in a binary, registers cannot be renamed since there is only a finite supply of physical registers. Hence SSA in a binary merely represents the version number for each register definition and use in annotations; it does not actually rename them. These annotations are good enough for dataflow, but do not help removing serialization from anti and output dependencies since there is no renaming. Hence the following is done.

Unlike in source code, in a binary, renaming is not needed to remove anti and output dependencies. This is because by placing anti or output dependent code on different processors, an implicit renaming is achieved since the same register name on different processors refers to different physical locations. The register file on commodity multiprocessors is duplicated on each processor. Hence no special treatment such as renaming is needed to handle anti and output dependencies. Such dependency edges are simply removed from the CDDG representation prior to parallelization. To maintain correctness, however, when enforcing true dependencies care is taken in code generation to communicate the copy of the register from the correct source processor to the use point. This correct processor is the processor to which the source of the true dependence is mapped, and hence is readily available.

Before the parallelization strategy is run, a data dependence edge can be added to the CDDG between pairs of memory references of which at least one is a write whenever the compiler is unable to prove that the addresses they access are always different. Since dependencies hinder parallelization, as many pairs of memory references are disambiguated (i.e., proved different), so that that dependence edge can be removed before parallelization. Proving that references are to different addresses is an established analysis in compilers and is called relative memory disambiguation (RMD). RMD does not require the rewriter to know which objects each reference accesses; instead only the relative difference between the addresses needs to be derived.

RMD is a well-studied problem in compilers and includes specialized techniques for array references, recursive data structures, and pointers. However all these techniques assume the source is available and these techniques perform their reasoning at the level of source variables. They do not directly apply to binary code where variable information is lost, and only registers and memory locations are named. No techniques exist for relative memory disambiguation in a binary rewriter.

Lacking existing RMD technique for a binary rewriter, the following can be performed. In this method, it is proved that the address expressions of two memory references differ by a non-zero constant. In the simplest version of RMD, a check is made whether the address expression of one of them is the same as the other one plus or minus a non-zero constant. In many cases this alone is successful at proving RMD. However it is not successful in all cases since it is possible for both the addresses to be derived from the same quantity, but with differing constants. For example, if the address of one of them is x+5 and the other is y+2, but y is earlier defined as x−1, then the two addresses are indeed different since y+2 is the same as (x−1)+2=x+1. (Here x and y are operands in the binary code.) However, neither is directly the other expression plus or minus a constant, hence the simple strategy fails.

A more effective RIVID strategy is one which is able to reason about expressions even when they are written differently, like in the above example. This is hard in general, but possible for the limited case of when addresses are linear polynomials of register and memory values. If the expressions are not linear polynomials, RMD fails. The tool can, in certain embodiments, search backwards in dataflow analysis from addresses of memory references, looking for equivalent expressions that are linear polynomials of registers and memory locations, combined by the +, −, or * operations. Then it will use an arithmetic converter to convert to the unique canonical form. For example, 8a+4b+1 is the unique canonical form of the polynomial 4*(b+2*a)+1, given a and b in that program order. For a pair of memory address expressions, if their unique canonical forms differ only by a constant, then they are relatively disambiguated.

Affine Loop Parallelism

Until this point, a non-loop parallelization method and methods to remove dependencies have been described. In addition to non-loop parallelization, many researchers have presented methods to parallelize loop iterations from the same loop to run on different processors. Most of these methods are for loops that contain array references whose indices are affine (linear combinations) of enclosing loop induction variables. The sections below describe how such affine loops are parallelized in a binary rewriter according to certain embodiments of the present invention. First, there is a review of how loops in source code are parallelized in existing compilers. Next, there is a description of a way in which to adapt these techniques to a binary rewriter.

The loop and non-loop parallelization strategies are not mutually exclusive; both are used in a binary rewriter according to certain embodiments of the present invention in an integrated way. One way to do this integration is as follows. Once a loop is parallelized, it becomes an alternate way to parallelize the CDDG level for that loop, instead of using the single-level parallelizer for that level. However this choice is not made immediately. Rather, at each level, the multi-level parallelizer, presented earlier, chooses the type of parallelism (loop or non-loop) for that CDDG that yields higher benefit. In this way, each CDDG level makes a choice that is best in a whole-program sense, since the multi-level strategy already chooses the most profitable parallelism across the program to commit first. This integration strategy can be implemented with different cost models too.

Parallelization from Source Code

This section overviews a simple strategy for parallelizing source-code loops containing array accesses whose indices are affine functions of enclosing loop induction variables. Many of the ideas in this section are adapted to a binary rewriter as shown in the next section. Although this strategy may appear simple, it is good for illustrative purposes.

To understand how parallelization can be done for affine-based loops, consider that dependencies between the instructions limit the parallelism that can be extracted in a code. The types of dependencies that occur in loops are called loop-carried dependencies and can be classified into three major categories: true, anti, and output loop-carried dependencies. FIG. 2 shows examples of each type.

Dependence vector ($\vec{D}$) for loops can be defined as a vector of n-dimensions, where n is the nesting depth of the loop. Each entry in the dependence vector can be the step of the loop dependence in that induction variable. For example, for the code in FIGS. 2(a) and 2(c) the dependence vector is $\vec{D}=(1,0)$, indicating that there is a dependence in steps of 1 along i, whereas there is no dependence along induction variable j. So, all iterations of i must be executed on one processor, whereas the iterations along j can be parallelized among all the processors. Pictorially, this is represented as Partition 1 in FIG. 3, which shows the iteration space as a 2-D matrix of i and j values. Conversely, in FIG. 2(b) the dependence vector is $\vec{D}=(0,2)$, indicating that there is a dependence in steps of two along induction variable j, and no dependence along induction variable. So, all iterations of j must be executed on one processor, whereas the iterations along can be parallized among all the processors. Pictorially, this is represented as Partition 2 in FIG. 3. Partition 3 in that figure can be used when there is no loop-carried dependence on either loop dimension (i.e., $\vec{D}=(0,0)$).

If parts (a) and (c) of FIG. 2 are parallelized, then the new bounds of induction variable j can be calculated as the iterations of j are executed among all the processors. If, for example, there are NPROC parallel cores, the new bounds of j can be calculated for each processor with a distinct PROC_ID as follows:

$$\text{new\_lb}_j = lb_j + \text{PROC\_ID} * \frac{ub_j - lb_j}{NPROC} \quad (1)$$

$$\text{new\_ub}_j = \text{new\_lb}_j + \frac{ub_j - lb_j}{NPROC} \quad (2)$$

Similarly, new bounds can be calculated for the induction variable i, if there was a non-zero dependence on j and a zero dependence on. The strategy presented here can be enhanced by various methods in many ways, such as diagonal partitions, loop splitting, loop fusion, and loop transformations.

Loop Parallelism from Binaries

The above method can be adapted to a binary rewriter. Having only the binary complicates affine-based parallelism since symbols for arrays and loop induction variables are not available, affine expressions are not available for index expressions, and array base addresses and sizes are not apparent. Given these complexities one may imagine that parallelizing such loops in binaries may be difficult; however, a method that is nearly as effective as parallelization from source can be performed using the binary, as discussed below.

A source code and one of its possible binary are shown in FIG. 4. Other binaries are also possible, but the general principles of a method according to certain embodiments of the present invention are illustrated with this example. The code assumes that the array is laid out in row major form, with the address of A[i,j] being computed as:

$$\&A[i,j]=A+i*\text{size\_}j+j*\text{element\_size} \quad (3)$$

where element_size is the size of an individual array element, and size_j is the size of the second array dimension, both in bytes.

To see how to parallelize the binary code, the following intuition is helpful: it is a simple proof to show that for any affine array access, its address variable is provably always an induction variable in its immediately enclosing loop. Of course, it is usually a derived induction variable, derived from the basic induction variables like i and j in the source. Induction variables are those which are incremented by a constant in every loop iteration. A derived induction variable d is of the form $$d=c_1*i+c_2,$$

where i is an induction variable with step s; hence d too is an induction variable with step $c_1*s$.

In the binary code in FIG. 4, addr_reg is the address register, which must be an induction variable by the above assertion. Starting from this address induction variable addr_reg, the following six special statements can be defined in the binary, (A) to (F), which will help to parallelize it, regardless of the exact binary code available:

(A) is an address variable increment. The rewriter searches for the increment of the address induction variable in the loop, and names it (A). See the example binary in FIG. 4 to find (A) to (F).

(B) is an address variable lower bound. The incoming value of the address induction variable (addr_reg in the example) is its lower bound; it is marked (B).

(C) is an address variable upper bound. The upper-bound comparison of the address variable for the loop-ending branch identifies the upper-bound of the address variable. It is searched for and marked (C).

(A) through (C) form a core methodology. However, when a loop has a second dimension, as is frequently done, the following further statements, (D) to (F), can be employed.

(D) is an outer loop induction variable increment. Statement (B)'s right-hand side value is checked to determine whether it contains another induction variable. If it does, it is distinguished as the induction variable of the next-outer loop. In the example it is i'. The increment which reveals this induction variable is marked (D).

(E) is an outer loop induction variable lower bound. The incoming value of the outer loop induction variable (i' in the example) is its lower bound; it is marked (E).

(F) is an outer loop induction variable upper bound. The upper-bound comparison of the outer loop induction variable for the loop-ending branch identifies the upper-bound of the address variable. It is searched for and marked (F).

Statements (A) to (C) are for the inner loop; and (D) to (F) are for the outer loop, if present. For loops nested to a depth of three or more, additional statements can be identified (e.g., (G) to (I) and so on). These special statements can be identified from almost any binary compiled from affine accesses, regardless of its exact form. Recognizing statements (A) to (F) in the binary relies primarily on induction variable analysis, which is easy for registers in binaries. By the definition of an induction variable, once it is recognized, its increment (or set of increments) reveal the statements (A) and (D). The incoming values, (B) and (E), immediately follow, as well as the exit conditions, (C) and (F). The recognizer according to certain embodiments of the present invention recognizes not only virtually all affine accesses written as such, but also affine accesses through pointers, since the pointers themselves will be induction variables. The only non-recognized case is when the constant increment of the induction variable is hidden by layers of indirection. This hidden situation can occur when the constant is in a memory location, or when the induction variable is not register-allocated. It is expected that these cases will be quite rare.

The address variables' lower bound value (RHS of (B)) can be called Initial_addr_reg and can be defined as:

$$\text{Initial\_addr\_reg}=\text{Base}+lb_i*\text{size\_}j+lbj*\text{element\_size} \quad (4)$$

From this addr_reg can be rewritten as:

$$\text{addr\_reg}=\text{Initial\_addr\_reg}+\text{num\_}i*\text{size\_}j+\text{num\_}j*\text{element\_size} \quad (5)$$

where num_i and num_j are the number of iterations on loop i and loop j respectively.

The special statements (A) to (F) are helpful since they assist in the performance of the remaining tasks in the rewriter: (i) deriving dependence vectors, (ii) deciding which loop dimensions can be partitioned, and (iii) actually performing the partitioning to generate parallel code. These are done in turn below.

Deriving Dependence Vectors

Next the dependence vector between pairs of array accesses in the loop can be defined. To do so, the code is imagined as having any two array references (not necessarily the two in the code example above) with addresses addr_reg1 and addr_reg2. Their expressions can be derived by substituting Initial_addr_reg in addr_reg above, yielding:

$$\text{addr\_reg}_1 = \text{Base}_1 + lb_i * \text{size\_j} + \text{num\_i} * \text{size\_j} + lb_j * \text{element\_size} + \text{num\_j} * \text{element\_size} \quad (6)$$

$$\text{addr\_reg}_2 = \text{Base}_2 + lb_i * \text{size\_j} + \text{num\_i} * \text{size\_j} + lb_j * \text{element\_size} + \text{num\_j} * \text{element\_size} \quad (7)$$

The expressions above differ only in differing base values. However a valuable observation is that affine addresses with different constants (such as A[i,j] and A[i+3,j+2]) appear in the binary as merely differing by a constant amount which gets rolled into the base. From the difference in the base the dependence vector $\vec{D}=(X,Y)$ can be inferred as:

$$|\text{Base}_1 - \text{Base}_2| = X * (\text{size\_j}) + Y * \text{element\_size} \quad (8)$$

where $$X = \left\lfloor \frac{|\text{Base}_1 - \text{Base}_2|}{\text{size\_j}} \right\rfloor \text{ and } Y = |\text{Base}_1 - \text{Base}_2| \% (\text{size\_j}).$$

Resolving Aliasing Uncertainties

When looking at two references in the binary whose addresses are induction variables, it is not immediately apparent if they access the same array or not. If they are to different arrays, then they surely have no direct dependence. The following cases can be distinguished:

If $\text{Base}_1 - \text{Base}_2 = 0$ (as proven by RMD) then they are the same array.

If $\text{Base}_1 - \text{Base}_2$ is a non-zero constant then they may be the same or different array. The range of accessed addresses of the two references can be checked to determine whether it is non-intersecting by checking if $\text{Base}_a + lb_i * \text{size\_j} + lb_j * \text{element\_size} > \text{Base}_b + ub_i * \text{size\_j} + ub_j * \text{element\_size}$ or $\text{Base}_b + lb_i * \text{size\_j} + lb_j * \text{element\_size} > \text{Base}_a + ub_i * \text{size\_j} + ub_j * \text{element\_size}$ is true. If true, then the references access non-intersecting address ranges, and have no dependence, else it can be conservatively assumed that they could be dependent. When the lower and upper bounds are all constants, this condition is evaluated at compile-time, otherwise a run-time check can be used. The run-time check chooses between parallel and serial codes at run-time.

If $\text{Base}_1$ and $\text{Base}_2$ provably access different segments, then they access non-intersecting addresses. An example of this situation is when one segment is the stack pointer plus a constant, and the other stack is an address in the global segment.

If none of the above apply, the binary rewriter can conservatively assume that the accesses could alias.

Whenever the two addresses are provably to non-intersecting ranges, X and Y are set to zero, implying no dependence. Otherwise, the values of X,Y calculated previously can be retained. If X or Y are not compile-time constants, conservatively the binary rewriter can assume they could be non-zero, which prohibits parallelization in that dimension.

Deciding Loop Dimensions to be Partitioned

From the values of X and Y it can be inferred whether the loop can be parallelized in the binary rewriter, much like the dependence vector is used in the case of compilation from source. In particular, a loop dimension can be parallelized if its dependence vector is provably zero. For example, if X is non-zero and Y is zero then the iterations of loop j can be parallelized.

Generating the Partitioned Loop(s)

Single Program Multiple Data (SPMD) parallel code for a loop can be generated by changing the loop's lower and upper bounds to implement partitioning (like in FIG. 3). For example to partition the inner loop, statement (B)'s lower bound is replaced by the new lower bound; and (C)'s upper bound is replaced by the new upper bound. The new bounds are calculated as follows.

$$\text{new\_lb}_{addr\_reg} = \text{Base} + lb_i * \text{size\_j} + lb_j * \text{element\_size} + \frac{\text{PROC\_ID} * (ub_j - lb_j) * \text{element\_size}}{\text{NPROC}} \quad (9)$$

$$\text{new\_ub}_{addr\_reg} = \text{new\_lb}_{addr\_reg} + \frac{(ub_j - lb_j) * \text{element\_size}}{\text{NPROC}} \quad (10)$$

Replacing the bounds in (B) and (C) generates the new parallel code to be executed on all the NPROC processors. If the outer loop is partitioned, then statements (E) and (F) are replaced in a similar manner. If both loops can be partitioned, the one that strides most array accesses along their cache lines can be chosen. Finally, if there is possible dependence along both the induction variables, then no parallelization is made.

Run-Time Discovered Parallelism

Sometimes two pieces of code cannot be proven to be parallel at compile-time, but at run-time they indeed have no dependencies between them and can be run in parallel. Such parallelism can be called run-time discovered parallelism. When parallelism between blocks at run-time can be determined before they execute, an a priori run-time check is used to check for parallelism. This run-time discovered parallelism is discussed at greater length below.

Automatic Parallelization Using a Priori Run-Time Checks

A priori run-time checks can be used for parallelization. These checks can be used when the fact of whether two code blocks are parallel is uncertain at rewriting time. Memory dependencies are uncertain when the rewriter cannot prove that the addresses for two references are always the same or always different; and at least one reference is a write. The rewriter can try to prove memory independence using relative memory disambiguation (RMD), as described above. When RMD fails, the references are said to be non-disambiguated references. For non-disambiguated accesses, the two tasks can run in parallel if the addresses are found to be different at run-time; they are serialized when found the same. Such a strategy will yield benefits if most of time the references access different addresses.

Deriving the address range for a non-disambiguated reference An a priori run-time check needs expressions for the unique address that the non-disambiguated reference accesses. However, sometimes the non-disambiguated reference may be in a loop compared to the check before the loop. In such a case, the run-time check needs the range of addresses the reference accesses in the loop. One class of references for which a range can be derived in general before the loop are those whose address expressions are (basic or derived) induction variables in the enclosing loop. For such references the lower and upper bound address expressions in the loop are easily derived statically. The expressions may not be constants of course, but rather are closed-form expressions which can be computed at run-time. In this case, the a priori run-time checks of ranges are done to ensure that this memory range is non-overlapping with the memory address or range in potentially parallel loops. This can be called the a priori induction variable optimization (AP-IVO).

Integration in CDDG Scheduling Approach

The a priori run-time checks can be incorporated into the hierarchical task parallelism approach discussed above and the CDDG can be modified in two ways before that method's parallelizer is run. First, memory dependencies are inserted between pairs of non-disambiguated memory references in the CDDG, and represented by dotted edges. For example, consider the CDDG in FIG. 5(a). It shows a dotted edge between nodes B and E because B contains a memory write to address X, E contains a memory read from address Y, and X and Y cannot be disambiguated. Solid edges represent other types of dependencies in the CDDG, namely control dependencies and certain (i.e., sure) data dependencies. In contrast, dotted edges represent uncertain data dependencies.

A second CDDG modification is to insert the a priori run-time checks. Given the original CDDG in FIG. 5(a), FIG. 5(b) shows the CDDG with a run-time check inserted in a new node G. The inserted code (shown) checks if the addresses of the non-disambiguated references (X and Y) are equal; if so, it waits for the memory write in B to MEM[X] to finish In the common case, unrelated non-disambiguated references will likely access different addresses (X≠Y), and hence no waiting will be needed.

To generate the code in G, the address expressions X and Y must be made available in G. If the address computation for Y is not an available expression in G, then it is hoisted up from E. "Available expressions" is a standard dataflow analysis. Regarding the address computation for X, if it is not available in G, then it can be recomputed in G or communicated from B, whichever is faster.

Extra Steps after Parallelization

Following the above modifications to the CDDG, the parallelization method mentioned above can be run without changes. In that method, the dotted dependence edges introduced here are ignored since two nodes connected by such an edge may still be parallelized using a priori run-time checks. After that method runs, however, the following two steps can be used to correctly generate code for such checks. First, run-time check nodes (such as node G in FIG. 5(b)) are not needed and hence can be deleted in case the parallelizer happens to schedule the non-disambiguated nodes (nodes B and E) on the same processor. In such a case, the nodes would be executed serially even without the check. Second, the code to wait for a memory write in the run-time check can be translated to semaphores. FIG. 5(c) shows how code with semaphores is inserted to implement the "Wait for B" in FIG. 5(b). In the figure, semaphore variable sem is initialized to 0 at the start of the program (not shown).

Every step above of a method according to certain embodiments of the present invention has been tailored for a binary rewriter. Examples of this binary-specialization are as follows. First, a priori checks are inserted in the first place when relative memory disambiguation, as was adapted to a binary above, fails. Second, range detection is done using derived induction variables in the binary, usually on the memory address register, rather than the basic induction variables in the source. Third, no optimizations are used that are unavailable in the binary, such as pointer analysis and dataflow analysis on source variables. Instead only the partial dataflow analysis possible on registers, combined with relative memory disambiguation, is used.

FIG. 6 illustrates a method according to certain embodiments of the present invention. As shown in FIG. 6, a method can include disassembling 610 a binary file. The method can also optionally include determining 620 functions in the disassembled binary file. The method can further include rewriting 630 the binary file without relocation information. The rewriting 630 can provide a physical transformation in a recording medium relative to the binary file in the recording medium prior to the rewriting 630. For example, the binary file as rewritten can have a length that is longer or shorter than the original binary. Additionally, the functional structure of the binary can change, such that the binary includes optimizations or security features. For example, the rewritten binary can include "junk code" designed to prevent reverse engineering.

The method can also include performing automatic parallelization 640 of the binary before rewriting the binary file. In this instance it should be understood that "before rewriting the binary file" is in reference to a parallelization occurring within a binary file rewriting process, not to a parallelization taking place in a compiling process. Thus, the "before rewriting the binary file" should not be taken to refer to a process outside the binary rewriting process, but rather to a process that occurs prior to the final rewriting.

The disassembling 610 the binary file, optionally determining 620 the functions in the disassembled binary file, performing automatic parallelization 640 of the binary before rewriting the binary file, and rewriting 630 the binary file can be performed by a particular machine. For example, the particular machine can be a special purpose binary rewriter machine, optionally equipped with an automatic parallelizer.

The performing automatic parallelization 640 can include identifying 641 affine loop parallelism and performing 634 the rewriting of the binary file to permit multiple core parallel processing of at least one identified affine loop.

The performing automatic parallelization 640 can include searching 642 for an increment of an address induction variable in a loop and storing this address as a first value.

The performing automatic parallelization 640 can include identifying 643 an incoming value of the address induction variable and storing this address as a second value.

The performing automatic parallelization 640 can include identifying 644 an upper bound comparison of the address variable and storing this address as a third value.

The performing automatic parallelization 640 can include checking 645 whether the second value has a right-hand side value that contains another induction variable, and when the right-hand side value contains the another induction variable, identifying and storing 646 fourth, fifth, and sixth values corresponding to the first, second, and third values, but for an outer loop corresponding to the another induction variable.

The performing automatic parallelization 640 can include checking 647 for a second outer loop and, when a second outer loop is detected, identifying and storing 648 seventh, eighth, and ninth values corresponding to the first, second, and third values, but for the second outer loop.

The performing automatic parallelization 640 can include deriving 649 a dependence vector. The performing automatic parallelization 640 can include resolving 650 aliasing uncertainties with respect to the dependence vector, and parallelizing 651 a loop dimension when its dependence vector is provably zero. The rewriting 630 the binary can include writing 635 single program multiple data code by changing a loop's upper and lower bounds to implement partitioning.

The performing automatic parallelization 640 can include identifying 652 non-affine parallelism. The rewriting 630 the binary file can include performing 636 the rewriting the binary file to permit multiple core parallel processing of at least one identified non-affine code instance. The identifying 652 the non-affine parallelism can include using 653 a graph-based program representation. Using 653 a graph-based program representation can include, for example, using 654 a control and data dependence graph representation, although using 653 a graph-based program representation is not limited to this example.

The method illustrated in FIG. 6 can be implemented in a variety of ways. For example, the method of FIG. 6 can, in certain embodiments, be implemented entirely in computer hardware. However, in other embodiments, a computer-readable medium can be encoded with instructions that, when executed in hardware, perform a process. The process can correspond, for example, the method illustrated in FIG. 6. Of course, it should be understood that even those embodiments of the present invention that rely on software cannot be implemented in software alone. Instead, the software must be structurally and functionally integrated with hardware in order to perform functions.

Figure 7:
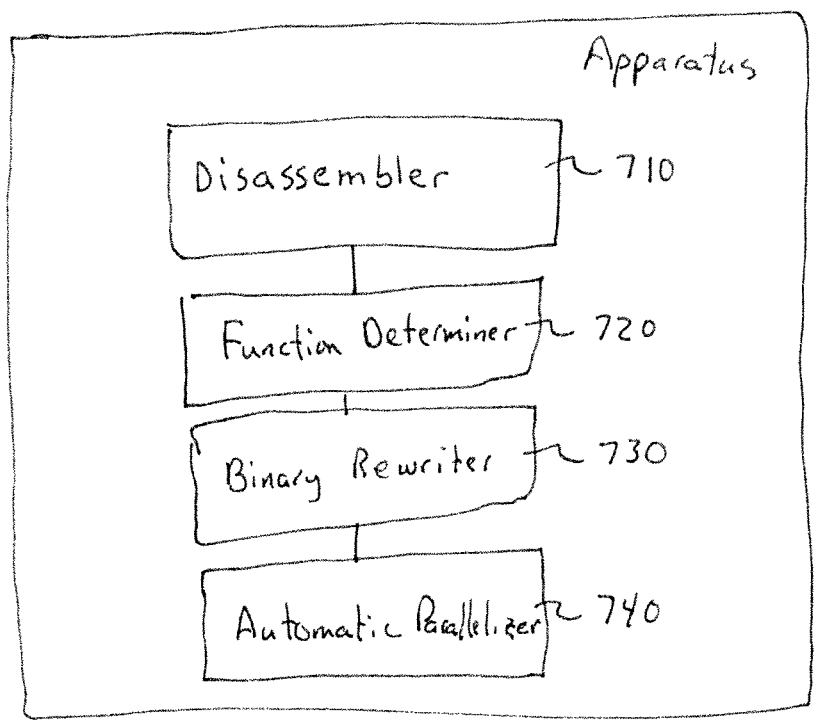
FIG. 7 illustrates an apparatus according to certain embodiments of the present invention.

FIG. 7 illustrates an apparatus according to certain embodiments of the present invention. The apparatus can include a disassembler 710 configured to disassemble a binary file. The apparatus can also optionally include a function determiner 720 configured to determine functions in the disassembled binary file. The apparatus can further include a binary rewriter 730 configured to rewrite the binary file, wherein rewriting the binary file provides a physical transformation in a recording medium relative to the binary file in the recording medium prior to the rewriting.

The apparatus can further include an automatic parallelizer 740 configured to perform automatic parallelization of the binary before rewriting the binary file. The automatic parallelizer 740 can be configured to identify affine loop parallelism and, with the binary rewriter 730, rewrite the binary file to permit multiple core parallel processing of at least one identified affine loop. The automatic parallelizer 740 can be configured to search for an increment of an address induction variable in a loop and store this address as a first value.

The automatic parallelizer 740 can configured to identify an incoming value of the address induction variable and store this address as a second value. The automatic parallelizer 740 can also be configured to identify an upper bound comparison of the address variable and store this address as a third value. The automatic parallelizer 740 can further be configured to check whether the second value has a right-hand side value that contains another induction variable, and when the right-hand side value contains the another induction variable, identify and store fourth, fifth, and sixth values corresponding to the first, second, and third values, but for an outer loop corresponding to the another induction variable.

The automatic parallelizer 740 can be configured to check for a second outer loop and, when a second outer loop is detected, identify and store seventh, eighth, and ninth values corresponding to the first, second, and third values, but for the second outer loop.

Additionally, the automatic parallelizer 740 can be configured to derive a dependence vector. The automatic parallelizer 740 can be configured to resolve aliasing uncertainties with respect to the dependence vector, and parallelize a loop dimension when its dependence vector is provably zero. The automatic parallelizer 740 can be further configured to, with the binary rewriter 730, write single program multiple data code by changing a loop's upper and lower bounds to implement partitioning.

The automatic parallelizer 740 can be configured to identify non-affine parallelism. Additionally, the automatic parallelizer 740 can be configured to, with the binary rewriter 730, rewrite the binary file to permit multiple core parallel processing of at least one identified non-affine code instance. Furthermore, the automatic parallelizer 740 can be configured to identify non-affine parallelism by using a graph-based program representation. The automatic parallelizer 740, can be, for example, configured to use the graph-based program representation by using a control and data dependence graph representation, although this is just one example.

The disassembler 710, optional function determiner 720, binary rewriter 730, and the automatic parallelizer 740 can be variously implemented. For example, they can be implemented as hardware modules. Alternatively, they can be embodied in a processor that is modified by a software module. There is no requirement that the disassembler 710, function determiner 720, binary rewriter 730, and the automatic parallelizer 740 be implemented in separate chips or separate controllers, although such embodiments are permitted. The disassembler 710, optional function determiner 720, binary rewriter 730, and the automatic parallelizer 740 may, in certain embodiments, be embodied on a multiple core processor that has been converted to be a special purpose machine by the use of software routines. The software routines may be stored in memory in the multiple core processor or in a separate memory.

Figure 8:
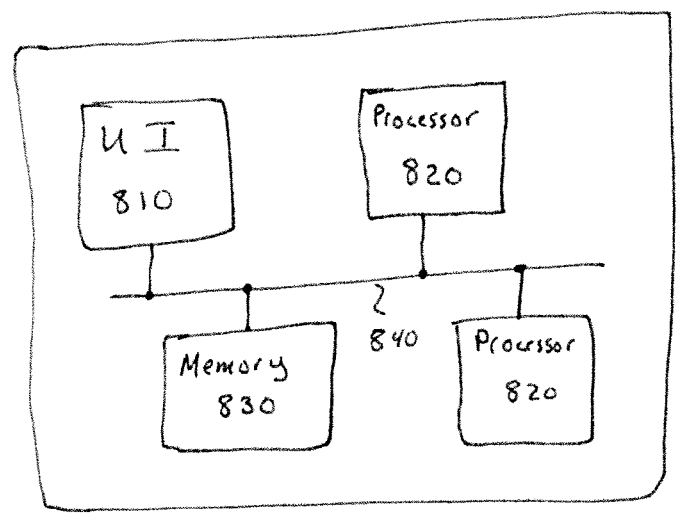
FIG. 8 illustrates an apparatus according to certain embodiments of the present invention.

FIG. 8 illustrates an apparatus according to certain embodiments of the present invention. As shown in FIG. 8, the apparatus may include a user interface (UI) 810, one or more processors 820, and memory 830. The UI 810 may include a monitor or other display device. The processor 820 can be, for example, a central processing unit (CPU) or application specific integrated circuit (ASIC). The memory 830 can be one or more physical device. For example, the memory 830 can include memory incorporated with the processor 820 or memory in a separate storage device, such as a hard disk drive (HDD). Other forms of memory are also permitted. The components of the apparatus may be interconnected by, for example, a bus 840, which may be a physical or logical bus. In an embodiment that does not include an integrated UI, the apparatus can be a blade of a rack-mounted computer system. The processor 820 can be specially designed for functions such as disassembling, determining functions, rewriting binary files, and automatically parallelizing. Alternatively, however the processor 820 can function as a general purpose computer running particular instructions that create a disassembler, determiner, binary rewriter, and automatic parallelizer, as discussed above with reference, for example, to FIG. 7.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims, which should be broadly understood in light of the specification. For example, while the code is described herein as binary code, the term binary code should be understood broadly so as also to include reference to object code, although object code is not conventionally considered binary code.

We claim:

1. A method, comprising:
   disassembling a binary file into a disassembled binary;
   performing automatic parallelization of the disassembled binary, without access to source code of the binary file, to provide a parallelized binary; and
   rewriting the binary file based on the parallelized binary, wherein the rewriting provides a physical transformation in a recording medium relative to the binary file in the recording medium prior to the rewriting, and wherein the disassembling the binary file, performing automatic parallelization of the disassembled binary, and rewriting the binary file are performed by a particular machine, wherein performing automatic parallelization comprises identifying affine loop parallelism and performing the rewriting of the binary file to permit multiple core parallel processing of at least one identified affine loop.

2. The method of claim 1, wherein the performing automatic parallelization comprises searching for an increment instruction of an address induction variable in a loop and storing an address of the increment instruction as a first value.

3. The method of claim 2, wherein the performing automatic parallelization comprises identifying an instruction defining an incoming value of the address induction variable and storing an address of the instruction defining the incoming value as a second value.

4. The method of claim 3, wherein the performing automatic parallelization comprises identifying an instruction containing an upper bound comparison of the address induction variable and storing an address of the instruction containing the upper bound comparison as a third value.

5. The method of claim 4, wherein the performing automatic parallelization comprises checking whether the second value has a right-hand side value that contains another induction variable, and when the right-hand side value contains the another induction variable, identifying and storing fourth, fifth, and sixth values corresponding to the first, second, and third values, but for an outer loop corresponding to the another induction variable.

6. The method of claim 5, wherein the performing automatic parallelization comprises checking for a second outer loop and, when a second outer loop is detected, identifying and storing seventh, eighth, and ninth values corresponding to the first, second, and third values, but for the second outer loop.

7. The method of claim 1, wherein the performing automatic parallelization comprises deriving a dependence vector.

8. The method of claim 7, wherein the performing automatic parallelization comprises resolving aliasing uncertainties with respect to the dependence vector, and parallelizing a loop dimension when its dependence vector is provably zero.

9. The method of claim 1, wherein rewriting the binary comprises writing single program multiple data code by changing a loop's upper and lower bounds to implement partitioning.

10. An apparatus, comprising:
    at least one processor and at least one memory, the at least one processor and the at least one memory comprising a disassembler configured to disassemble a binary file into a disassembled file, an automatic parallelizer configured to perform automatic parallelization of the disassembled binary, without access to source code of the binary file, to provide a parallelized binary, and a binary rewriter configured to rewrite the binary file based on the parallelized binary, wherein rewriting the binary file provides a physical transformation in a recording medium relative to the binary file in the recording medium prior to the rewriting, wherein the automatic parallelizer is configured to identify affine loop parallelism and, with the binary rewriter, rewrite the binary file to permit multiple core parallel processing of at least one identified affine loop.

11. The apparatus of claim 10, wherein the automatic parallelizer is configured to search for an increment instruction of an address induction variable in a loop and store an address of the increment instruction as a first value.

12. The apparatus of claim 11, wherein the automatic parallelizer is configured to identify an instruction defining an incoming value of the address induction variable and store an address of the instruction defining the incoming value as a second value.

13. The apparatus of claim 12, wherein the automatic parallelizer is configured to identify an instruction containing an upper bound comparison of the address induction variable and store an address of the instruction containing the upper bound comparison as a third value.

14. The apparatus of claim 13, wherein the automatic parallelizer is configured to check whether the second value has a right-hand side value that contains another induction variable, and when the right-hand side value contains the another induction variable, identify and store fourth, fifth, and sixth values corresponding to the first, second, and third values, but for an outer loop corresponding to the another induction variable.

15. The apparatus of claim 14, wherein the automatic parallelizer is configured to check for a second outer loop and, when a second outer loop is detected, identify and store seventh, eighth, and ninth values corresponding to the first, second, and third values, but for the second outer loop.

16. The apparatus of claim 10, wherein the automatic parallelizer is configured to derive a dependence vector.

17. The apparatus of claim 16, wherein the automatic parallelizer is configured to resolve aliasing uncertainties with respect to the dependence vector, and parallelize a loop dimension when its dependence vector is provably zero.

18. The apparatus of claim 10, wherein the automatic parallelizer is configured to, with the binary rewriter, write single program multiple data code by changing a loop's upper and lower bounds to implement partitioning.

19. A non-transitory computer-readable medium encoded with instructions that, when executed in hardware, perform a process, the process comprising:
    disassembling a binary file into a disassembled binary;
    performing automatic parallelization of the disassembled binary, without access to source code of the binary file, to provide a parallelized binary; and
    rewriting the binary file based on the parallelized binary, wherein the rewriting provides a physical transformation in a recording medium relative to the binary file in the recording medium prior to the rewriting, and wherein the disassembling the binary file, performing automatic parallelization of the disassembled binary, and rewriting the binary file are performed by the hardware, wherein performing automatic parallelization comprises identifying affine loop parallelism and performing the rewriting of the binary file to permit multiple core parallel processing of at least one identified affine loop.

* * * * *